June 30, 1964  C. M. HENDERSON ETAL  3,139,541
GENERATION OF POWER USING EMISSIVE MATERIALS
Original Filed July 5, 1960  3 Sheets-Sheet 1

INVENTORS
COURTLAND M. HENDERSON
ROBERT G. AULT
BY *Herman O. Bauermeister*

ATTORNEY

June 30, 1964  C. M. HENDERSON ETAL  3,139,541
GENERATION OF POWER USING EMISSIVE MATERIALS
Original Filed July 5, 1960   3 Sheets-Sheet 2

INVENTORS
COURTLAND M. HENDERSON
ROBERT G. AULT
BY Herman O. Bauermeister
ATTORNEY

3,139,541
GENERATION OF POWER USING EMISSIVE MATERIALS
Courtland M. Henderson, Xenia, and Robert G. Ault, Dayton, Ohio, assignors to Monsanto Company, a corporation of Delaware
Original application July 5, 1960, Ser. No. 40,683. Divided and this application Nov. 20, 1961, Ser. No. 153,344
1 Claim. (Cl. 310—4)

The present invention relates to emissive materials, processes for the production of same, and specific devices in which the said unique emissive compositions are an essential part. It is an object of the invention to provide electrodes and other emissive elements which are characterized by high thermal and electrical conductivities, by unusually stable and high electron emissivities over a wide range of temperatures, and which at the same time overcome problems of prior art materials such as sagging and corrosion of elements operated at high temperatures, and of minimizing spalling or blistering of coatings used to increase the emissivity of prior art materials.

The present invention is directed to emissive bodies such as electrodes used in thermionic devices in which the said electrodes are comprised of a metal matrix consisting of at least one member selected from the class consisting of nickel, iron, cobalt, tungsten, molybdenum, columbium, tantalum, chromium, vanadium, copper, silver, gold, platinum, and iridium having internally dispersed therein a refractory additive as a reinforcing agent such as a metallic oxide, carbide, boride, silicide or nitride, particularly of the rare earth metals of the lanthanum group, thorium, titanium, zirconium, columbium, tantalum, hafnium, vanadium, molybdenum, and tungsten.

In a preferred embodiment of the invention the internally dispersed modifying agent is a member of the class consisting of cerium oxide, neodymium oxide, praseodymium oxide, lanthanum oxide, thorium oxide, and mixtures thereof.

In a more preferred embodiment of the invention, the intimately dispersed additives in the said metal matrix are based upon very fine particles or nuclei of the additives, e.g., oxides, such as from 10 to 500,000 Angstrom particle size. More preferred particle size ranges are 10 to 10,000 Angstrom microns, or if narrower fractions are desired, 50 to 10,000 Angstrom, with the most preferred range being 50 to 225 Angstrom particle sizes.

The concentration of the reinforcing components existing as a distinct phase as nuclei internally dispersed in the matrix metal is from 0.25% to 50% by volume, a preferred range being from 0.25% to 35% by volume.

The use of the present additives, e.g., the above oxides, has been found to result in the production of especially efficient emissive bodies when the reinforcing component such as the oxides existing as nuclei in the metal matrix have an inter-nuclei spacing of 10 Angstroms to 200,000 Angstroms, or preferably 10 Angstroms to 5,000 Angstroms.

Still more preferred ranges in the region of close nuclei spacing is the use of an inter-nuclei spacing of 10 to 225 Angstroms.

It has long been recognized in the electronic industry, and particularly in the manufacture of radio tubes that the useful life of such tubes is often shortened by: (A) failure of the prior art metals and alloys to have sufficient creep strength to prevent sagging and warping of the components that are required to operate at elevated temperatures; (B) the emissivities of prior art materials, whether operated as hot or cold cathodes, decreased with time thereby lowering the output of the tube; and (C) particularly in the case of oxide coatings on metal base cathode materials, the difference in coefficients of expansion between the metal and oxide coating is so great that spalling or blistering or flaking off of the coatings from the base is a common occurrence that seriously shortens the life of emitters so constructed.

Similarly in the construction and operation of thermionic heat-to-energy conversion devices, it has been difficult to find cathode and anode materials with the necessary combination of resistance to flaking, high thermal and electrical conductivities, high creep strength and high emissivities to permit the design of units for this severe service. In the case of the vacuum type thermionic energy converter, it is quite important that very close and uniform spacings be maintained between the hot or emitting cathode and the collector or cool anode. In this application operating temperatures ranging well in excess of 1,000° C. are desired in order to obtain maximum energy conversion efficiencies. Oxidation resistance, in addition to high creep strength at high temperatures is quite desirable but these properties are not attainable with prior art metals and alloys at temperatures much above 900° C. and in particular above 1,000° C.

To maximize efficiency of heat input to electrical output with thermionic units, it is important that the inner emitting surface of the hot cathode be maintained at the highest temperature feasible for a given material. The heat resistant, high-temperature, high-strength metallic materials of the prior art are usually alloyed for strength and improved corrosion resistance purposes. Such prior art materials or metals exhibit notably lower thermal and electrical conductivities than the metals of this invention. In general the use of ceramic type hot cathodes is not favored due to the lower thermal and electrical conductivities of such materials as comparaed with the improved metals of this invention.

In the use of electron discharge devices, one of the common limitations of the useful life is a decrease in the electron emissive capabilities of the cathode that is occasioned by the flaking or peeling off of the surface coating or emissive oxide material from the surface of the cathode base metal. This problem is especially accentuated in discharge devices employing nickel cathodes in a mercury vapor atmosphere, such as in Thyratrons, since amalgamation or wetting of the nickel by mercury tends to destroy the bond at the interfaces between the nickel metal and the emissive oxide layers thereon. It therefore follows that reduction of this flaking or peeling results in an improved cathode imparting longer useful life to electron discharge devices.

Directly heated, thorium-activated thermionic emitters of filament type comprised of tungsten wire containing thorium oxide are well known in the art. Such directly heated filamentary emitters have certain serious limitations from both an electrical and mechanical standpoint. For example it is difficult to produce reliable structures characterized by good mechanical strength, ease of assembly, uniform emission and freedom from gasiness using prior art tungsten base metals. Also many such emitters have been found to have an undesirably high ratio of heater power to emitter current. A further problem well known to the industry is that when either alloys or relatively pure metals are coated by alkali earth oxides or thorium oxide, such metals tend to develop interfacial layers with the alkaline earth oxides. Such an effect lowers the emissivities of this type of prior art material.

Earlier workers in the field of cathode manufacture have incorporated various bodies into the cathode, such as fibers or with a refractory metal extending through an emitting oxide. Another modification was the sintering of emitting oxide particles on a metal base, or conversely, sintered oxides used as a core which was then covered with a sintered metal layer. However, all of these cathodes have been very costly to fabricate and have been characterized by short life, nonuniform emissivity and mechanical failure.

The advantages and characteristics of the materials and processes of this invention with regard to overcoming the foregoing problems will appear in the ensuing description.

The present invention overcomes the foregoing disadvantages of the prior art electrodes by the provision of improved articles of manufacture which exhibit high emissivities, high electrical and thermal conductivities, and which retain said high emissivities as well as high creep strength and resistance to distortion even at elevated temperatures. Furthermore, the present improved electrodes have the ability to bond emissive oxide coatings, if a coating is optionally desired, more tenaciously than prior art metals, and are more readily processed and formed into intricate shapes than was generally with prior art metals and alloys.

The electrodes of the present invention are high strength articles of manufacture consisting of a matrix of at least one metal of the matrices described above and having intimately dispersed therein a refractory additive. A preferred group of the said additives is an oxide selected from the group consisting of cerium oxide, neodymium oxide, praseodymium oxide, lanthanum oxide, thorium oxide, and mixtures thereof.

Figures 11, 12:
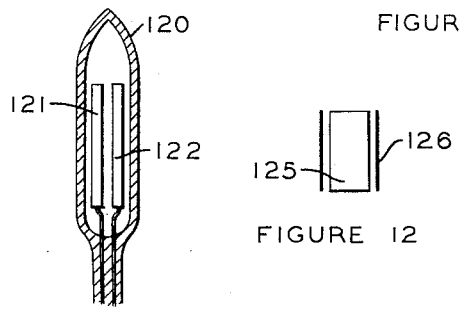

FIGURES 11 and 12 schematically represent the invention applied to gas discharge devices.

Examples of oxide mixtures commercially available and of utility in the invention have the following approximate compositions:

60% (by weight) of $Nd_2O_3$, 17% $Pr_6O_{11}$, 10% $Sm_2O_3$, and 13% of other rare earth oxides consisting primarily of $Gd_2O_3$ and $CeO_2$.

41% (by weight) $Pr_6O_{11}$, 24% $Sm_2O_3$, 14% $Gd_2O_3$, 5% $Nd_2O_3$, 5% $CeO_2$, and 11% of other rare earth oxides consisting primarily of $Y_2O_3$ and $La_2O_3$.

50% (by weight) Ce oxide, 24% La oxide, 17% Nd oxide, and 9% of other rare earth oxides consisting primarily of Pr oxide, Sm oxide, and Gd oxide.

46% (by weight) $La_2O_3$, 33% $Nd_2O_3$, 10% $Pr_6O_{11}$, 6% $Sm_2O_3$ and 7% of other rare earth oxides consisting primarily of $Gd_2O_3$, $CeO_2$, $Y_2O_3$.

95% (by weight) of $ThO_2$ and 5% of oxides consisting primarily of rare earth elements.

In general, the various commercially available mixtures of rare earth compounds and the refractory additives derived therefrom may be used, with the above critical group of matrices to produce an improved electrode.

In the practice of the present invention, the specific dispersing refractory material, such as the oxide, is the essential additive, although minor proportions of metals other than the matrix metals as described above may also be present. The dispersed refractory material is employed either as a pure material or in various commercial mixtures wherein the said refractory material is the major component.

The electrodes of the present invention are prepared by consolidating an intimate dispersion of the aforesaid matrix metal and the refractory material. This may be based upon a mechanically blended mixture of the base metal and the dispersed refractory material, or a mixture resulting from chemical precipitation, or coating techniques whereby either the metal or the refractory material is the core and the outer covering of the indicated particles. However, a preferred embodiment of the invention is based upon the preliminary production of a mixture of oxides of the matrix group and the oxide group by oxidizing a solution of compounds of the respective components by volatilization and oxidation in a flame.

Such crude oxide mixture is then subjected to reducing conditions such as by contacting with hydrogen gas to reduce the matrix metal while leaving the oxide component dispersed at a molecular level in the metal. The powder is consolidated by hot or cold pressing, extruding, rolling, impact or explosive forming, etc., to obtain the ultimate electrode and supporting hardware. Thus, the electrodes may have a unitary construction in which both the emissive and the support elements are made of the above-described reinforced metal, or the present emissive electrode materials may be held in place by posts or hardware such as nickel, tungsten, and other conventional materials.

The following examples illustrate specific embodiments of the present invention and show various comparisons against prior art compositions, materials, and processes.

*Example 1*

One preferred method for preliminarily forming the starting materials of the present invention is to oxidize an atomized solution of at least one soluble salt of the matrix metal selected from the aforesaid group with a salt selected from the said oxide components, e.g., of cerium, neodymium, praseodymium, lanthanum, thorium, and mixtures thereof. In the present specific example a salt of praeseodymium is dissolved in a solvent such as water or alcohol, the said oxidation being conducted by means of an oxidizing flame to produce particles composed of members selected from the group consisting of the free metals and oxides of the first group and the Pr oxide in molecular combination and thereafter subjecting the said particles to reducing conditions, e.g., with hydrogen, to produce the said elemental metal of the aforesaid group, having dispersed therein unreduced Pr oxide. For example, when nickel nitrate and Pr nitrate are dissolved in water in the desired proportions, e.g., to yield 92% (by volume) nickel metal and 8% Pr oxide in the final product, and the said solutions are atomized and oxidized in an oxidizing flame, a powder is produced which is comprised of nickel oxide and Pr oxide. The Pr oxide is dispersed within the individual mixed oxide particles at a molecular level. The foregoing combination of Pr oxide and nickel oxide is reduced at a temperature of from about 500° C. to 700° C. in a hydrogen containing atmosphere, preferably more than 8 volume percent hydrogen. Other reducing atmospheres such as carbon monoxide, water gas, forming gas, etc., are also useful for this purpose. The nickel oxide is substantially entirely reduced to metallic nickel with the Pr oxide remaining unaffected, and being dispersed at the substantially molecular level within the microstructure of the nickel as a matrix.

*Example 2*

As another example, when chloroplatinic acid and Ce nitrate in the proportions desired in the ultimate product, e.g., 95% Pt and 5% Ce oxide are dissolved in water and the resulting solution atomized and oxidized in an oxidizing flame, a powder is produced which is comprised of platinum and Ce oxide. The Ce oxide is dispersed within the platinum matrix of the individual particles at a molecular level. This material is readily fabricated to a shaped body under the pressure and temperature conditions set forth herein, e.g., at about 1500 p.s.i. and 1500° C. by hot pressing. After forming the powder comprised of the free metal and having the additive oxide dispersed therein, a preliminary fabrication or compacting step may be employed. This, for example, can consist of hydrostatic compaction, cold-pressing, or slip casting, as well as other consolidation procedures to form a densified green billet. Such billets are then consolidated further by sintering in the aforesaid reducing atmosphere at temperatures of about three-quarters of the melting point (absolute) of the metal matrix material. It has been found preferable to use a reducing atmosphere (as by pure hydrogen or hydrogen diluted with nitrogen as obtained from cracked ammonia) in this sintering operation.

The reduced free metal matrix with the molecularly dispersed oxide is consolidated into a shaped body. Preferred conditions for such consolidation are pressing at pressures ranging from 1,000 p.s.i. to 500,000 p.s.i., the most preferred range of consolidation pressures being 40,000 p.s.i. to 140,000 p.s.i. Temperatures for such consolidation may range from room temperatures to 95% of the absolute melting point of the matrix metals. The application of pressure and heat may be carried out simultaneously, as in hot-pressing or they may be completed in individual consecutive steps. Other consolidation steps may also be carried out in order to densify the product or to shape the preliminary bodies into ultimate commercial shapes, such as wire, rods, sheet stock, and other structural shapes and fabricated devices, such as electrical cores. Conventional fabrication techniques such as hot-extrusion, hot-rolling to sheet stock, wire drawing to small diameter wire sizes, forging swaging, and other metal fabrication processes may be readily employed to the appreciably better workability of the materials of this invention as compared with common tungsten alloys, and other similar materials described in the prior art.

*Example 3*

The individual nuclei of the oxide in the broadest aspect of the invention are present with a nucleus-nucleus spacing of from 10 to 200,000 Angstroms. In a preferred embodiment of the invention, the reinforcing oxide is present in the consolidated metal in a molecular degree of dispersion as shown by X-ray diffraction data, with more than 80% of such oxide nuclei separated at distances of from 10 to 5,000 Angstroms. More preferred nucleus-to-nucleus spacing is of the order of from 10 to 225 Angstroms and such spacings are quite common in the present electrodes. These figures have also been found to be applicable to the other metal matrices and reinforcing oxides described above.

*Example 4*

Figure 1:
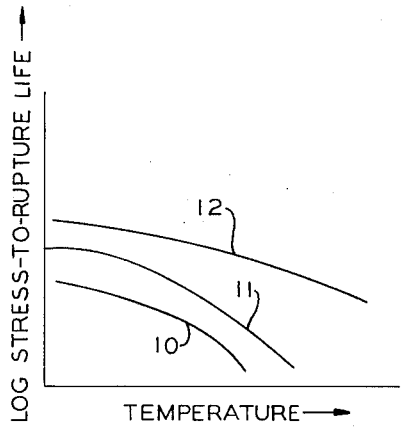
FIGURES 1 to 4, 7 and 8 depict characteristic curves of various electrode materials of the prior art and of the present invention.

With regard to the improved creep strength of the electrodes of this invention when used as high temperature hot cathodes, FIGURE 1 illustrates, via stress-rupture diagrams, the relative resistance to creep or high temperature strength of several prior art alloys versus a metal typical of this invention. Curve 10 of FIGURE 1 depicts the relative low strength of a pure metal, for example, a typical nickel cathode material. Curve 12 shows that the strength of a typical metal of this invention for example, nickel strengthened with 8% by volume of $CeO_2$, is greatly increased, e.g., nearly twice as strong and creep resistant as the commercial nickel commonly used as electrode posts, electrodes and grids. Curve 11 shows a typical nickel alloy also used in emissive type devices such as radio tubes. The strength of this alloy is considerably less, over a broad range of temperatures, than that of the comparable metal of this invention shown in curve 12. Thermionic diodes made to operate at a cathode temperature of 1200–1250° C., with a spacing of 0.0008 inch between large area type cathode and anode remained properly spaced and delivered high power output for more than double the life of an identical diode constructed with conventional alloy nickel coated with barium oxide.

*Example 5*

Figure 2:
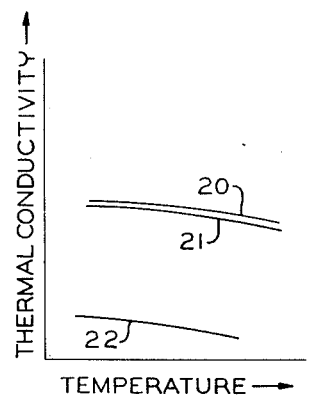
Figure 3:
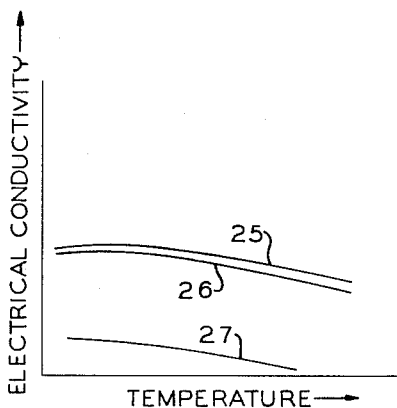

The thermal and electrical conductivities of the metals of this invention, as compared with those for typical electrode metals and alloys are shown in FIGURES 2 and 3 in which values of thermal conductivity and electrical conductivity vs. temperature, respectively, are plotted. As shown in FIGURE 2, we have found, for example, that the use of neodymium oxide when added at a concentration of 6% by volume to a matrix metal of molybdenum decreases the thermal conductivity by approximately 6%. This is shown by comparing curve 21, showing the thermal conductivity vs. temperature for a molybdenum-neodymium oxide metal of this invention with curve 20 which shows the variation of the thermal conductivity of pure molybdenum vs. temperature. Curve 22 of FIGURE 2 shows the low thermal conductivity of a conventional solid solution type molybdenum-silver alloy as compared with pure molybdenum and a metal of this invention.

In FIGURE 3, curve 26, it is shown that the specific use of 6% by volume of neodymium oxide in a metal matrix (e.g., molybdenum) gives electrical conductivities which are very close to that for pure molybdenum, curve 25, and substantially greater than that obtained with an alloy of molybdenum and silver, curve 27.

Thus, by the addition of the dispersed oxide, it has been shown that it is possible to retain thermal and electrical conductivities nearly as high as for the low strength pure cathode metals while retaining, and even exceeding, the high creep strengths of the poorly conducting but strong cathode type alloys.

Higher thermal and electrical conductivities are also obtained when the present metal matrices, strengthened with the present refractory materials are compared with the same metals strengthened by conventional alloying techniques.

*Example 6*

Figure 4:
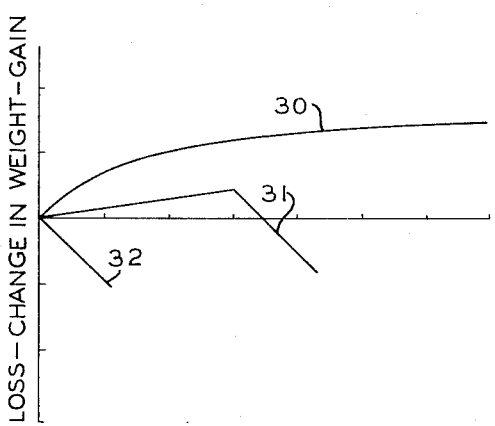

FIGURE 4 shows the relative resistance to oxidation by 6.5% by volume cerium oxide in nickel, curve 30, as compared with a typical nickel-chrome alloy, curve 31, under cyclic heating and quenching conditions in which the specimens were heated rapidly in air to 1100° C., held for one hour at 1100° C. in air, then air quenched to room temperature. The superiority of such cerium oxide-strengthened nickel over a conventional heat resistant alloy, curve 31, under such severe conditions is quite significant and of value for applications where metals are to be used under even slightly corrosive or oxidizing conditions as might be occasionally encountered in improperly evacuated tubes at temperatures up to and exceeding those used in this test. For example, as shown in curve 30 of FIGURE 4, nickel strengthened with 6.5% by volume of cerium oxide showed a leveling off tendency in percent gain-in-weight after 3–4 cycles. The strength of the cerium oxide-strengthened test electrodes were apparently unaltered even after 20 such thermal cycles in air. The conventional nickel-chromium alloy, as shown in curve 31, failed catastrophically after only three cycles and pure nickel (curve 32) was also severely damaged after only one cycle.

*Example 7*

Another embodiment of the invention is the coated type of cathode, since there are many applications in which an alkali earth oxide emissive surface is desirable. In such types of cathodes, the coating of the alkali earth oxide such as baria or calcia is applied to a consolidated matrix of the present base metals, e.g., columbium, which base metal has internally dispersed therein 7% by volume of neodymium oxide. In the present example, the oxides exist as nuclei at a molecular degree of dispersion and have a nucleus-to-nucleus distance of from 50 to 2000 Angstroms, with 50% of the nucleus-to-nucleus spacing less than 500 Angstroms apart. The oxide nuclei ranged in size from 50 to 2000 Angstroms with in excess of 50% of the nuclei being less than 500 Angstroms.

The superiority of the metals of this invention with regard to overcoming the problem of minimizing spalling and flaking off of emissive coatings from prior art base metals used in electrodes was found to be dually effective.

Figure 5:
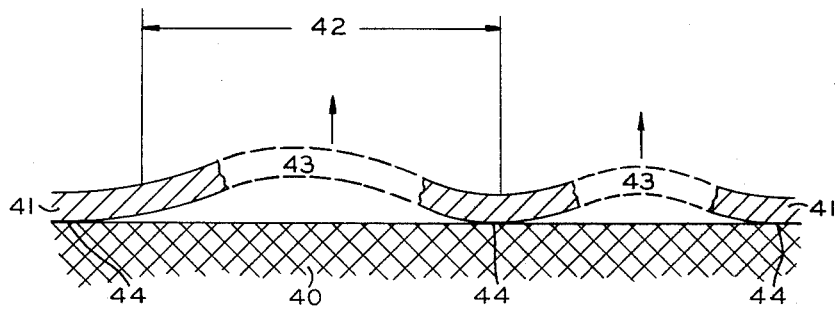
FIGURES 5 and 6 are intended to contrast prior art electrode coatings with those of the present invention.
Figure 6:
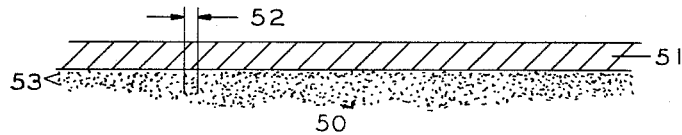

For example, FIGURE 5 shows the kind of flaking or spalling away of an emissive coating, 41 and 43, from a prior art cathode metal, 40, after as few as 20 severe thermal cycles. Such loss of emissive coatings seriously lowers the average emissivity of the cathode and lessens the efficiency of devices utilizing such materials. The distance 42 between anchor or bonding points, 44, between the film and the base metal is too large to prevent flexing or blistering of the film away from the base metal. Accordignly, the emissive film, 43, soon spalls off, and its loss lowers the efficiency of the device in which such materials are used. By comparison, in FIGURE 6 based on electrodes of the present invention the presence of a very large number of molecularly spaced refractory particles, 53, in a matrix metal, 50, offers a very short space, 52, between anchor points for the emissive film 51. This close spacing between anchor points bonding the film to the base metal of this invention minimizes the degree of film flexing during thermal cycling and thereby substantially eliminates thermal spalling and flaking.

A further point of improvement of the materials of this invention with respect to obtaining better bonding of emissive coatings as compared with prior art materials is that of wetting or bonding between emissive coatings applied to the materials of this invention is more readily achieved, especially when an emissive coating contains as a major component the refractory material internally dispersed as a strengthening agent in the matrix metal. The presence of the same (thoria) or mutually soluble components (strontia and ceria, e.g.) in the emissive coating material and the electrode metal promote bonding which substantially eliminates coating losses.

Secondly, the use of the said refractory compounds of this invention dispersed so uniformly throughout the entire electrode or grid provides electrodes and grids with emissivities that are superior to conventional alloys and metals as well as electrodes and grids with highly emissive coatings on conventional metals and alloys.

Example 8

Figure 7:
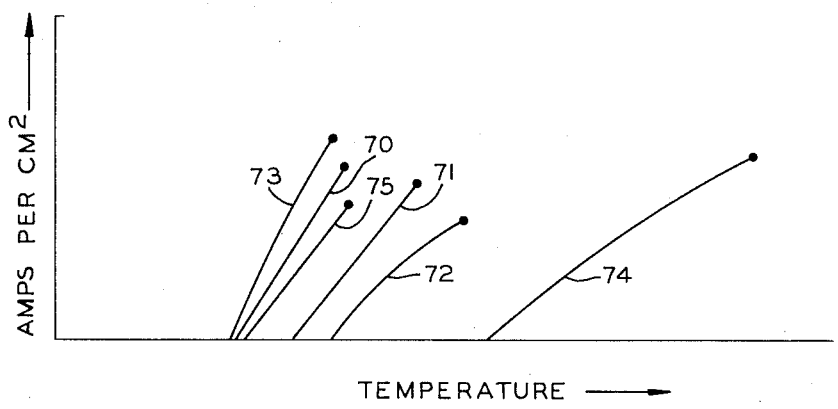

As shown in FIGURE 7, the emissions obtained with a typical metal of this invention consisting in this case of molecularly sized cerium oxide particles uniformly dispersed through the interior and on the surface of nickel as a matrix metal are compared with the same ceria strengthened nickel coated with barium oxide and several prior art materials. The ordinate of FIGURE 7 represents the saturation emission densities of the several types of emitters in amperes per square centimeter of surface, plotted to a logarithmic scale, while the abscissa shows the temperature of the emitter in degrees centigrade. The curves of FIGURE 7 were obtained by applying a D.C. voltage of about 500 volts with an anode spacing of 1 cm. and by measuring the cathode current produced at various temperatures. Curve 70 represents the emission from an electrode of nickel plus ceria (10% by volume) with nuclei sizes ranging from 70 to 3000 Angstrom and internuclei spacing ranging from 50 to 1000 Angstrom. Curve 72 shows the variation of emissivity of thoriated tungsten with temperature. Curve 71 represents the emission from a cathode of lanthanum hexaboride. Curve 73 represents the emissivity of a barium oxide coated cathode of nickel-ceria like that shown in curve 70. Curve 74 represents the curve for a tungsten cathode and curve 75 shows the emissivities of a barium oxide coated commercially available nickel cathode. Specifically within the relations of FIGURE 7 a current density of 0.03 amps per square centimeter as obtained at 850° C. with the nickel-ceria, curve 70, is obtained only at substantially higher temperatures with prior art tungsten (2100° C.), thoriated tungsten (1450° C.) and lanthanum hexaboride (1200° C.). The dependence of emissivities on cathode temperature between coated and uncoated nickel-ceria cathodes is not so great, showing that the ceria strengthened nickel is good enough to be used without a coating, and is superior to typical prior art cathode materials.

Example 9

Figure 8:
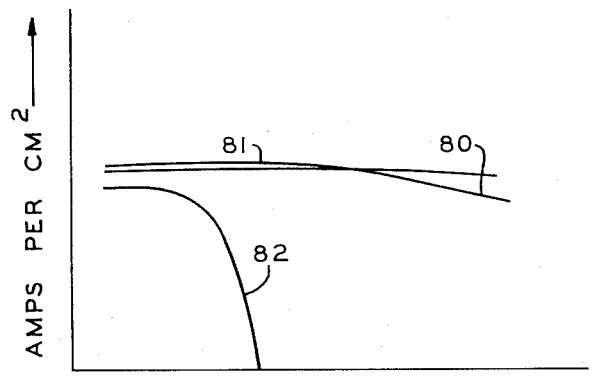

The change in emissivity of typical prior art electrode materials with thermal cycling is compared with the emissivity of two typical electrode materials of this invention. This is shown in FIGURE 8 where the change in cathode current density expressed as amps per square centimeter is plotted against the number of thermal cycles. Each thermal cycle consisted of quickly heating the cathode to 1100° C., holding the cathode at constant temperature for about 3 minutes, then quickly cooling the cathode to about 100° C. For example, under the conditions of the relations shown in FIGURE 8, curve 80 shows that the cathode current density of the nickel-ceria of curve 70 of FIGURE 7 remained practically constant over better than 70 thermal cycles. The cathode current density of the barium oxide coated nickel-ceria of this invention, curve 81, began to drop off gradually after 45 thermal cycles, suggesting that bonding of the barium oxide to the nickel-ceria remained tight and that of the barium oxide content was possibly being lost only at a slow rate due to evaporation. Curve 82 shows that a prior art barium oxide coated nickel alloy cathode lost most of its barium oxide coating after only 20 thermal cycles. The comparative performance results shown in FIGURES 7 and 8 clearly demonstrate the important improvements of the emissivities and life of the materials of this invention over those of the prior art.

Example 10

Another advantage of this invention over prior art methods and materials is to be found in the manufacture of highly emitting electrodes, particularly where prior art coating techniques are employed.

The present invention is a great improvement over the coated cathodes of the prior art. Thus, the use of a painted or deposited coating of oxides, carbonates, etc., of various salts on a metal base as employed in the past has been characterized by considerable difficulties in maintaining a uniform coating which maintains constant emissivity characteristics with continued use. It has been impractical to form special electrode shapes after the brittle refractory coatings are applied. This limits the applications of prior art highly emissive coated materials to shapes that may be coated only in final form. The electrodes of this invention, due to the fact that they contain the said refractory materials dispersed internally, uniformly and closely throughout the body of the metal electrode and because such materials may be readily hot and cold worked by conventional means into intricate shapes without damage to the emitting surface, offer significant advantages over prior materials and methods of fabrication. For example, an electrode of 0.1" diameter was readily produced from a tungsten matrix metal with 4% by volume of ceria of particle size or nuclei ranging from 50 to 2500 Angstroms with nucleus-to-nucleus spacings of 20 to 2000 Angstroms within the body of the shaped electrode. This electrode exhibited a work function of 1.8 e.v. over a temperature ranging from 1200–1500° C. Similar data for a conventional tungsten wire electrode yielded a work function of 4.5 e.v. over temperatures from 1200–1600° C. This shows that under similar conditions electrodes based on the present materials have a superior work function and a correspondingly higher emissivity.

Example 11

Figure 9:
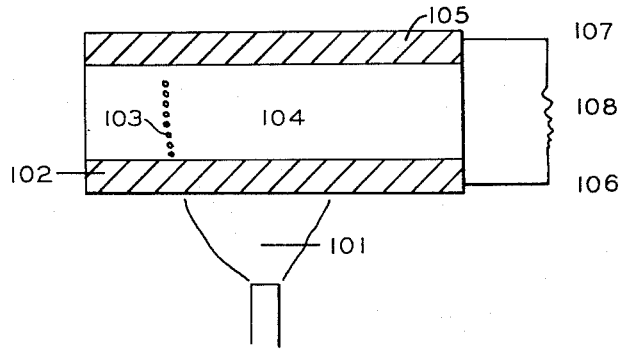
FIGURES 9 and 10 show the invention applied respectively to a thermionic and a thermoelectric power converter.

Another embodiment of the invention is the use of electrodes of the present invention for thermionic power generation as shown in FIGURE 9. Here the provision of a heat source to an emissive plate of the above described matrix metal with the specific internally dispersed oxides makes it possible to emit a flow of electrons across an evacuated or gas filled space to another electrode which in turn is connected through a circuit with the emitting electrode, thus providing for a continuous supply of electricity. FIGURE 9 shows a simplified schematic diagram of a thermionic generation system in which 101 is a heat source which directs heat to the electrode element 102, which upon being heated emits electrons 103 across the vacuum in space 104 to the relatively cooler electrode 105, made of the same internally fortified material, or another similar material, or even a conventional metal, such as nickel or iron. Leads 106 and 107 attached to the two electrical elements, provide for contacts to an external circuit 108 to employ the electric power which is produced.

The heat input to the thermionic power generating device may be from various conventional sources, preferably at high temperatures such as nuclear or solar energy, as well as heat obtained from the combustion of mineral fuels. In all such applications, corrosion resistance, and stability of the electrode emission material is a serious problem. Consequently the alloys used in this part for this service have been far from satisfactory. For example (nickel with 5% volume of ceria) electrode of the present invention based upon a metal matrix containing internally dispersed therein an oxide selected from the group consisting of cerium oxide, neodymium oxide, praseodymium oxide, lanthanum oxide, thorium oxide, and mixtures thereof, are particularly useful in this respect and overcome the prior art difficulties. In each instance, the internally reinforced metallic electrode is superior in refractory properties, that is thermal stability, creep strength and resistance to corrosion relative to the corresponding pure metal.

In the above example of the 5% ceria in nickel, the oxide nuclei ranged from 80 to 3000 Angstroms and the nucleus-to-nucleus spacing was from 70 to 2000 Angstroms.

An advantage of the present electrodes for thermionic generation is the high electron emitting capacity concomitant with a low evaporation rate, thus providing for high electrical efficiency and long life in this severe type of service.

Figure 10:
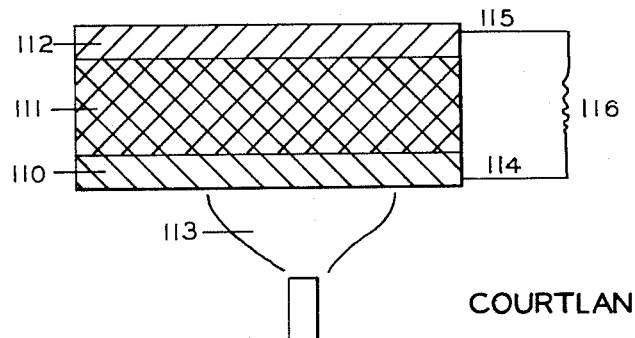

In addition the high thermal conductivities and electrical conductivities, the excellent oxidation resistance, the high emissivities, the high strength at high temperatures, and the ready formability characteristics of the electrodes of this invention also make them applicable for use in thermo-electric energy converters as shown in FIGURE 10. Here, electrode 110, consisting of platinum strengthened with 5% by volume of neodymium oxide, absorbs and transmits high thermal energy from a source, element 113 to element 111 consisting of an efficient thermoelectric material, gallium arsenide. Element 112 removes the unused thermal energy from element 111 and due to its high emissivity rejects the waste heat to the atmosphere. Element 112 is comprised of a copper matrix in which 4% by volume of $Al_2O_3$ is dispersed. Leads 114 and 115 connect the electrodes 110 and 112 to an external load 116, completing the circuit.

Cathodes of the materials described above constitute an important embodiment of the present invention. Thus, in the application of this improved electron emissive material in an electron discharge tube, an envelope of glass, ceramics, metals, etc., is provided as the envelope to contain a gaseous atmosphere. Such atmosphere of a non-reactive, ionizable gas or vapor may be maintained at vacuum conditions to super-atmospheric pressures such as up to three atmospheres in accordance with the type of service for which the tube is to be used.

The tube jacket contains at least one cathode and an anode across which the electron flow is to be operated. Various auxiliary electrodes such as a grid, etc. may also be present as desired for various control purposes. For example, a nickel electrode with 5% by volume of ceria is a representation of the present invention based upon a metal matrix containing internally dispersed therein an oxide selected from the group consisting of cerium oxide, neodymium oxide, praseodymium oxide, lanthanum oxide, thorium oxide, and mixtures thereof, are particularly useful in this respect and overcome the prior art difficulties. In each instance, the internally reinforced metallic electrode is superior in refractory properties, that is thermal stability, creep strength and resistance to corrosion relative to the corresponding pure metal.

In the above example of the 5% ceria in nickel, the oxide nuclei ranged from 80 to 3000 Angstroms and the nucleus-to-nucleus spacing was from 70 to 2000 Angstroms.

An advantage of the present electrodes for thermionic generation is the high electron emitting capacity concomitant with a low evaporation rate, thus providing for high electrical efficiency and long life in this severe type of service.

*Example 12*

The drawings, FIGURE 11 and FIGURE 12, of the present patent application show a specific embodiment of the invention as an electron tube or gas discharge device. The tube envelope, 120, of glass, ceramic, or metal contains electrodes 121 and 122. The electrodes are shown as conventional structures, although various shapes are possible, and numerous electrodes may also be present in the envelope. However, the essential electron emitting electrode, typically the cathode, 121, is formed from the dispersion-strengthened metal matrices described above. The anode electrode, 122, is formed either from a similar material or from a conventional metal. The anode is not subjected to the severe operating conditions of the cathode as described above. FIGURE 12 shows a variation of the invention in which a coated cathode is used. This is composed of a base, 125, of the above dispersion-strengthened metal having a coating, 126, of another emissive material such as barium oxide deposited thereon.

The tube also contains a gas filling which is ionized in the operation of the tube. However, the present electrodes are equally applicable to high vacuum tubes.

The present patent application contains subject matter which is also referred to in copending applications Serial Nos. 27,542, 27,543, 27,544, 27,545, and 27,546, filed May 9, 1960 and Serial No. 40,683, filed July 5, 1960. The present patent application is a division of the latter-most application.

What is claimed:

Process for generating electric power which comprises applying heat to one face of a body of a metal selected from the group consisting of nickel, iron, cobalt, tungsten, molybdenum, columbium, tantalum, chromium, vanadium, copper, silver, gold, platinum and iridium, and having molecularly dispersed therein from 0.25% to 50% by volume of an oxide selected from the group consisting of cerium oxide, neodymium oxide, praseodymium oxide, lanthanum oxide, thorium oxide, as a second component existing as nuclei of 10 to 500,000 Angstrom particle size, and which are a discrete phase with the nucleus-to-nucleus distance between the oxide nuclei being from 10 to 225 Angstroms, the other said face being in a space under vacuum conditions, and the said space also having another electrode therein, at a colder temperature, and withdrawing an electric current between the two said electrodes.

References Cited in the file of this patent

UNITED STATES PATENTS

| | | |
|---|---|---|
| 1,922,244 | Hunter | Aug. 15, 1933 |
| 2,700,000 | Levi | Jan. 18, 1955 |